United States Patent Office 3,177,676
Patented Apr. 13, 1965

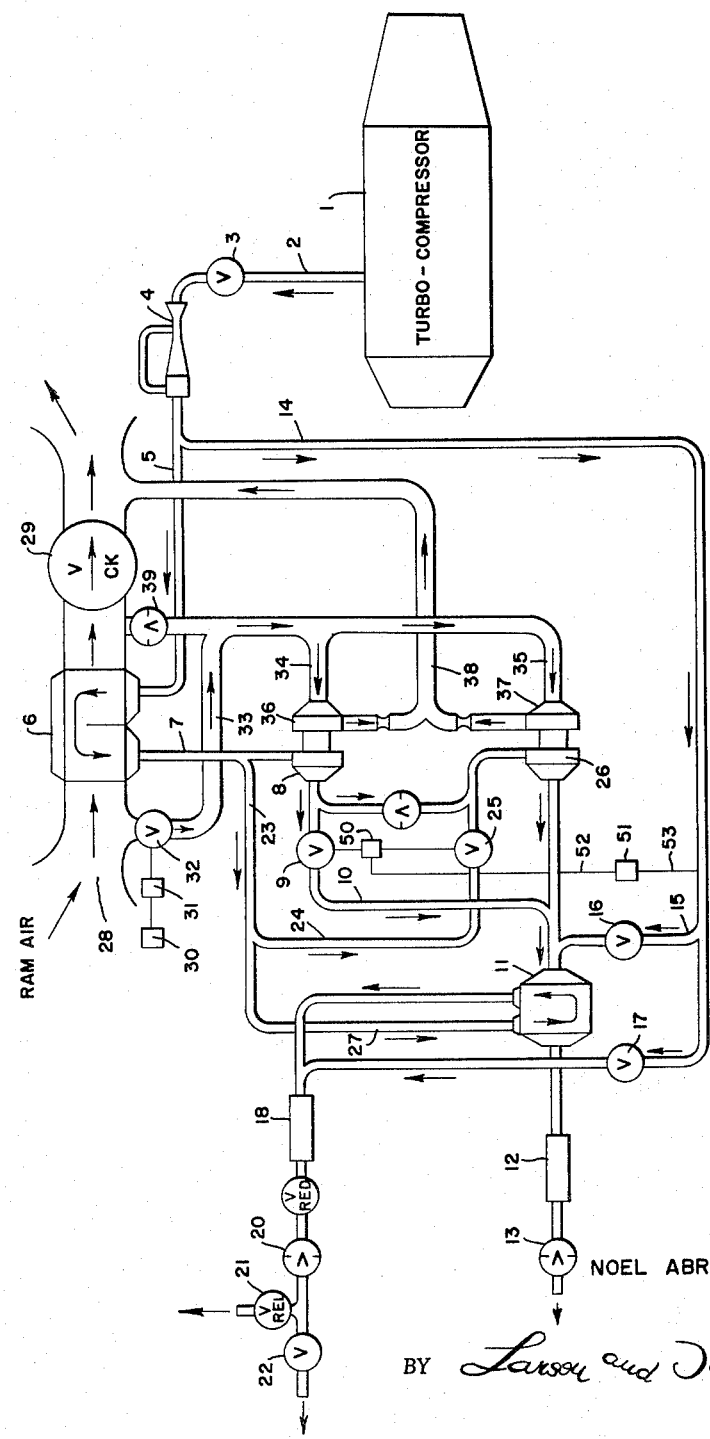

3,177,676
AIR CONDITIONING SYSTEMS
Noel Abrahams, Yeovil, England, assignor to
Normalair Limited, Somerset, England
Filed Mar. 27, 1964, Ser. No. 355,509
Claims priority, application Great Britain, Apr. 10, 1963,
14,246/63
9 Claims. (Cl. 62—172)

This invention relates to systems incorporating plural turbines which are energized or driven from a source or sources having substantial supply pressure variations over the extreme operating range, wherein the system includes arrangements for exploiting the optimum practical performance of the turbines throughout the range of operating conditions. More particularly, the invention relates to air conditioning systems, especially for aircraft, incorporating plural turbines and arranged to exploit the optimum practical performance of the turbines and thus of the system.

There are numerous instances in the art where one or more turbines are utilized in applications where the pressure of the driving fluid supply varies substantially over the operating range. For instance, the source of supply may be a turbo-compressor in an aircraft, and the pressure will vary considerably with engine speed. Variation in the supply pressure creates large variations in pressure ratio across the turbine which is supplied from this source. The efficiency and mass flow of a turbine vary with the pressure ratio across the turbine and depend to a large extent on the design of the turbine nozzle or nozzles, and the efficiency is maintained at an optimum value only over a moderate range of pressure ratio around the design pressure ratio. In large power plant systems, the effects of varying pressure ratios are lessened somewhat by using variable nozzle turbines. However, the ancillary equipment associated with this type of machine is rather complicated and usually is extremely bulky, and while variable nozzles tend to stabilize the mass flow, the turbine efficiency is still quite poor at conditions well removed from design conditions. Consequently variable nozzle turbines have substantial shortcomings in applications requiring high efficiencies over the entire operating ranges and where both space and weight are at a premium, as in aircraft air conditioning systems.

Generally it is an object of this invention to provide a system for exploiting the optimum performance of turbines when operating from a source of supply that changes considerably over the operating range of the system.

More particularly it is an object of this invention to provide such a system incorporating a first turbine and a second turbine operating from a source of variable supply pressure and arranged in such a manner as to enable them to be compounded in either series or parallel relationship depending on the pressure of the supply source, the changeover being accomplished in response to predetermined variations in the pressure of the supply source.

More specifically it is an object of this invention to provide a system generally as set forth in the preceding paragraph and having passages for connecting the inlets of two turbines to the pressurized driving source, a passage for connecting the outlet of the first turbine to the inlet of the second turbine, valve means for selectively closing off the inlet of the second turbine from the source of pressurized air, valve means for closing off the outlet of the first turbine from its normal discharge passage so as to direct the discharge from the first turbine through the connecting passage to the inlet of the second turbine, and preferably having a valve in the connecting passage for preventing flow from the second turbine to the first turbine, whereby the first and second turbines can be compounded in either series or parallel relationship in accordance with the conditions of the source of pressurized air.

It is a further object of this invention to provide an aircraft air conditioning system incorporating a compound turbine system as set forth in the preceding paragraphs, the system further including at least one initial heat exchanger through which the driving fluid passes prior to entering the turbines, the system also including controlled bypass passages for selectively bypassing the turbines to provide a convenient method of temperature control.

It is yet a further object of this invention to provide a system as set forth in the preceding paragraph incorporating a second heat exchanger through which the fluid from the turbines passes prior to entering a space to be cooled, wherein the second fluid for the second heat exchanger is taken directly from the source of pressurized driving fluid, this second fluid being then directed to an additional space to be cooled.

It is yet a further object of this invention to provide a system as set forth in any of the preceding paragraphs further comprising passages for passing ram air through the first heat exchanger as the cooling medium therefor, the turbines driving fans which can be supplied directly with ram air or which can selectively induce the flow of ram air through the first heat exchanger during periods of low ram air supply.

Other and further objects, features and advantages of the invention will be apparent to those skilled in the art from the following description of an exemplary embodiment taken with reference to the accompanying drawing, wherein there is schematically illustrated an aircraft air conditioning system incorporating the invention.

Referring to the drawing, a turbo-compressor type aircraft engine is shown at 1 with a bleed passage 2 controlled by a valve 3 connected to a convenient tapping point of the compressor portion of the power plant. Bleed passage 2 conveniently can include an air flow regulator 4 which can be any of several types well known in the art, the particular details of the air flow regulator forming no part of the instant invention. From the air flow regulator 4 the pressurized air passes along passage 5 to heat exchanger 6, and is conducted from heat exchanger 6 through passage 7 to the inlet of an expansion turbine 8. Branch passages 23 and 24 lead a portion of the pressurized driving air from passage 7 through shutoff valve 25 to the inlet of a second expansion turbine 26. The expanded driving fluid is conducted from the outlets of turbines 8 and 26 to a space to be cooled, the expanded fluid passing through a second heat exchanger 11, a water separator 12, and a non-return valve 13. A shutoff valve 9 is incorporated in the outlet passage of expansion turbine 8.

A conduit connects the discharge outlet of turbine 8 at a point upstream of shutoff valve 9 with the inlet conduit of turbine 26 at a point downstream of shutoff valve 25, this conduit preferably including a non-return valve for preventing flow from the second turbine 26 toward the first turbine 8.

A bypass passage 14 is connected to the pressurized driving fluid passage 5 for bypassing a portion of the driving fluid through branch passage 15 and control valve 16 directly to the discharge outlet conduit of turbines 8 and 26, thus providing a convenient method of temperature control by varying the quantity of driving fluid which bypasses the two turbines.

The two valves 9 and 25 are controlled or actuated in the same sense by an actuator 50 (shown schematically interposed between the valves) which may comprise any of several well known types, the actuator in turn being controlled or actuated through line 52 by a pressure switch or similar sensing device 51 in response to variations in the pressure of the driving fluid. In the drawings the switch or sensing device is shown in communication with the bypass conduit 14 through connecting line 53, but obviously the communication could be effected at any convenient point upstream of the turbines. Preferably the valve actuating or controlling combination comprises a pneumatically operated electric switch controlling an electric power circuit for an electric actuator or actuators for the two valves 9 and 25, although it will be understood that equivalent pneumatic circuits and components may be used. Such components are well known in the art, and the particular details thereof do not form any part of the instant invention. Regardless of whether an electric or a pneumatic actuating system is used, it will be understood that the pressure switch or sensing device and the valve actuator are arranged to close valves 9 and 25 in response to a predetermined high pressure in bypass passage 14 and to open valves 9 and 25 in response to a predetermined low pressure in the bypass passage, whereby the expansion turbines 8 and 26 are compounded in series and parallel relationship, respectively. Thus during periods of high pressure from the driving fluid source, the high pressure ratio which otherwise would be impressed on the turbines is in effect split between two turbines because of their series connection, whereas during periods of low pressure from the driving fluid source the pressure ratio is impressed across each turbine because of their parallel relationship, thus maintaining the operating pressure ratio across the turbines reasonably close to the design pressure ratio.

Before discharging the cold air into the cabin or other space which is to be cooled, it is often convenient and desirable to utilize this cold air for cooling other aircraft services, such as cooling air to an air vent suit, prior to using it for cooling the main cabin. To provide for this, branch passage 27 leads a portion of the pressurized driving air through second heat exchanger 11 in heat exchange relationship with the cooled air from the first and second expansion turbines, this secondary air then passing from heat exchanger 11 through a conventional water separator 18, a conventional reducing valve, a non-return valve 20, and a shutoff valve 22, and on to the space to be cooled. A relief valve 21 may be provided to compensate for any excess pressures or pressure surges.

In order to provide work for the expansion turbines to enhance their cooling ability, the two turbines 8 and 26 are drivingly connected to fans or compressors 36 and 37, which normally have their inlets connected through conduits 33, 34 and 35 to a ram air intake duct 28. Shutoff valve 32 controls the passage of air through duct 33, and valve 32 is in turn controlled or actuated by an electrical actuator 31 which is controlled by a pressure switch 30 responsive to the ram air pressure. Pressure switch 30 and electrical actuator 31 are arranged to close valve 32 during periods of low ram air pressure. When valve 32 is closed fans 36 and 37 induce cooling air through the ram air intake 23 across the main heat exchanger 6 and through non-return valve 39 into the inlets of the fans, thus assuring adequate flow of coolant to the main heat exchanger 6 during conditions of insufficient ram air pressure. Non-return valve 29 is incorporated in the ram air passage to prevent back flow of air through passage 28 and valve 39 during periods of low ram pressure.

An additional bypass branch passage controlled by valve 17 is provided for controlling the temperature of the secondary cooling air which passes through conduit 27 and heat exchanger 11.

The operation of the system will be readily apparent to those skilled in the art from the foregoing description. The supply air for the system at high temperature and pressure is bled from the compressor portion of the power plant 1 and is pre-cooled by the main heat exchanger 6. The air is further cooled by expansion in the two expansion turbines 8 and 26 which will be in either series or parallel relationship depending upon the pressure of the driving air from the supply source, as sensed by the pressure switch or pressure sensing device. In response to the pressure sensed, the device operates the electric actuator at a predetermined pressure of the supply source so as to either open or close butterfly valves 9 and 25 which preferably are coupled together to operate simultaneously so as to place the turbines either in series or parallel compound relationship. The turbines will be in series at high supply pressures and in parallel at low supply pressures. Irrespective of whether the turbines are compounded in series or parallel relationship, the cooled pressurized air from the main heat exchanger 6 expands and drives the turbines which in turn drive the fans 36 and 37, thereby inducing cooling air across the main heat exchanger 6 during periods or conditions of low ram air pressure. The work of expansion in the turbines further cools the supply air, and this air leaves the turbines as cold air and is passed to the cabin of the aircraft for air conditioning and pressurization purposes. Branch passage 27 and secondary heat exchanger 11 provide cooling air for additional spaces to be cooled. Temperature control of the system is accomplished through control of bypass valves 16 and 17.

It will be obvious to those skilled in the art that numerous refinements and modifications may be carried out on the basic system as disclosed and illustrated herein without departing from the scope of the invention. It will be further appreciated that the invention is not limited to the provision of two turbines only, but rather that any practical number of turbines can be utilized in an arrangement according to the invention. Accordingly, it should be understood that the described embodiment is to be taken as exemplifying and not as limiting the invention, and that the invention is to be limited only by the subjoined claims as interpreted in the light of the foregoing description and illustration. Having thus fully described my invention, I claim:

1. In an air conditioning system for an aircraft, a first turbine and a second turbine, a heat exchanger, first passage means for connecting the inlets of said first and second turbines through said heat exchanger to a source of pressurized air, second passage means for connecting the outlets of said first and second turbines to at least one space to be cooled, third passage means for connecting the outlet of said first turbine to the inlet of said second turbine, valve means in said first passage means for selectively closing off the inlet of said second turbine from the source of pressurized air, valve means in said second passage means for selectively closing off the outlet of said first turbine from the space to be cooled, and valve means for closing off said third passage means against flow from said second turbine to said first turbine, whereby said first and second turbines can be compounded in either series or parallel relationship in accordance with the conditions of the source of pressurized air.

2. Apparatus as set forth in claim 1 further comprising bypass passage means for connecting said first passage means and said second passage means so as to bypass said first and second turbines, and bypass valve means for controlling the flow through said bypass passage means.

3. Apparatus as set forth in claim 1 further comprising a second heat exchanger through which said second passage means passes, and take-off passage means for passing a portion of the pressurized air from said first passage means through said second heat exchanger in heat exchange relationship with the air passing through said second passage means and on to a second space to be cooled.

4. Apparatus as set forth in claim 3 further comprising bypass passage means for connecting said first passage means to said second passage means uptream of said second heat exchanger and to said take-off passage means downstream of said second heat exchanger so as to bypass said first and second turbines, and bypass valve means for controlling the flow through said bypass passage means to said second passage means and said take-off passage means, respectively.

5. Apparatus as set forth in claim 1 further comprising first and second fan means driven by said first and second turbines, respectively.

6. Apparatus as set forth in claim 5 further comprising ram air passage means for passing ram air through said heat exchanger as the cooling medium therefor.

7. Apparatus as set forth in claim 6 further comprising means connecting the inlets of said first and second fan means with said ram air passage means.

8. Apparatus as set forth in claim 7 wherein said last mentioned means comprises passage means and valve means for selectively connecting the inlets of said fan means to said ram air passage means upstream or downstream of said heat exchanger, whereby said fan means can induce coolant flow across said heat exchanger during periods of low ram air supply.

9. A compound turbine system for use with a variable source of driving fluid, comprising: a first turbine and a second turbine, passage means for connecting the inlets of said first and second turbines to a source of driving fluid, first valve means for selectively cutting off the inlet said second turbine from the source of supply, second valve means for closing the outlet of said first turbine, passage means interconnecting the outlet of said first turbine at a point upstream of said second valve means with the inlet of said second turbine at a point downstream of said first valve means, valve means in said last mentioned passage means for preventing flow therethrough from said second turbine to said first turbine, and means responsive to the inlet pressure of the driving fluid for opening said first and second valves to place said turbines in parallel during periods of low pressure and for closing said first and second valves to place said turbines in series during periods of high pressure.

References Cited by the Examiner
UNITED STATES PATENTS

| | | | |
|---|---|---|---|
| 2,557,099 | 6/51 | Green | 62—402 |
| 2,767,561 | 10/56 | Seeger | 62—402 |
| 2,871,671 | 2/59 | Bartlett | 62—172 |
| 2,871,672 | 2/59 | Boydell | 62—172 |
| 2,930,205 | 3/60 | Walker | 62—402 |
| 3,097,508 | 7/63 | Leech | 62—402 |

ROBERT A. O'LEARY, *Primary Examiner.*